(12) United States Patent
Godsted et al.

(10) Patent No.: US 6,729,783 B2
(45) Date of Patent: May 4, 2004

(54) KEYBOARD DEFLECTION CONTROL

(75) Inventors: Jeffrey W. Godsted, Round Rock, TX (US); Patrick V. Illingworth, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 10/151,351

(22) Filed: May 20, 2002

(65) Prior Publication Data

US 2003/0215277 A1 Nov. 20, 2003

(51) Int. Cl.$^7$ ................................................ B41J 11/56
(52) U.S. Cl. ..................... 400/682; 400/692; 400/693; 400/472; 400/488; 341/22; 345/168
(58) Field of Search ........................ 345/168; 341/22; 400/682, 680, 692, 693, 472, 488, 489

(56) References Cited

U.S. PATENT DOCUMENTS

| | | | |
|---|---|---|---|
| 4,528,428 A | * | 7/1985 | Gotoh et al. ................ 200/5 A |
| 5,490,037 A | * | 2/1996 | Clancy ........................ 361/680 |
| 5,613,786 A | | 3/1997 | Howell et al. |
| 5,717,431 A | | 2/1998 | Chia-Ying et al. |
| 5,735,618 A | | 4/1998 | Gluskoter et al. |
| 5,764,474 A | * | 6/1998 | Youens ....................... 361/680 |
| 5,774,384 A | | 6/1998 | Okaya et al. |
| 5,966,284 A | * | 10/1999 | Youn et al. .................. 361/680 |
| 5,969,644 A | * | 10/1999 | Koutaka ....................... 341/22 |
| 6,038,127 A | * | 3/2000 | Ries ........................... 361/680 |
| 6,039,478 A | * | 3/2000 | Chou .......................... 400/472 |
| 6,510,048 B2 | * | 1/2003 | Rubenson et al. .......... 361/680 |
| 6,542,160 B1 | * | 4/2003 | Abgrall ....................... 345/537 |

\* cited by examiner

*Primary Examiner*—Andrew H. Hirshfeld
*Assistant Examiner*—Dave A. Ghatt
(74) *Attorney, Agent, or Firm*—Haynes and Boone, LLP

(57) ABSTRACT

A computer keyboard includes a base having a user surface. A keyboard is mounted on the user surface. The keyboard includes a support plate having a first surface and a second surface. The second surface is convex and abuts the base. A plurality of keyboard keys are mounted adjacent the first surface. Attachment tabs are provided on the support plate to secure the support plate to the base which biases the convex surface into continuous contact with the base.

18 Claims, 3 Drawing Sheets

KEYBOARD DEFLECTION CONTROL

BACKGROUND

The disclosures herein relate generally to computer systems and more particularly to controlling keyboard deflection associated with such systems.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

A problem associated with the use of keyboards is that keyboards are often spongy and springy when the user depresses the keyboard keys. Attempts have been made to avoid this through added support under the keyboard and by increasing the stiffness of the keyboard by means of material selection and thickness.

Therefore, what is needed is a keyboard constructed in a manner which provides a keyboard which is substantially firm and avoids the spongy springy feeling associated with keyboard use.

SUMMARY

One embodiment, accordingly, provides a keyboard including a support plate having a first surface and a second surface. The second surface is convex. A membrane is mounted on the first surface and a plurality of keys are mounted on the first surface adjacent the membrane. A plurality of retainer members extend from the support plate.

A principal advantage of this embodiment is that the underside of the keyboard support plate is continuously biased into contact with a keyboard base or chassis so that the spongy or springy feeling of previous keyboards is removed.

DETAILED DESCRIPTION

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
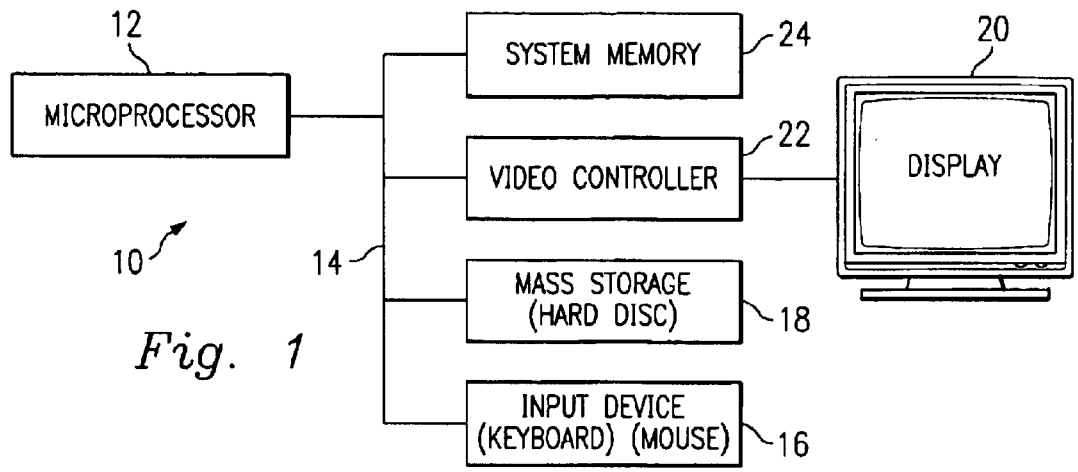
FIG. 1 is a diagrammatic view illustrating an embodiment of a computer system.

In one embodiment, computer system 10, FIG. 1, includes a microprocessor 12, which is connected to a bus 14. Bus 14 serves as a connection between microprocessor 12 and other components of computer system 10. An input device 16 is coupled to microprocessor 12 to provide input to microprocessor 12. Examples of input devices include keyboards, touchscreens, and pointing devices such as mouses, trackballs and trackpads. Programs and data are stored on a mass storage device 18, which is coupled to microprocessor 12. Mass storage devices include such devices as hard disks, optical disks, magneto-optical drives, floppy drives and the like. Computer system 10 further includes a display 20, which is coupled to microprocessor 12 by a video controller 22. A system memory 24 is coupled to microprocessor 12 to provide the microprocessor with fast storage to facilitate execution of computer programs by microprocessor 12. It should be understood that other busses and intermediate circuits can be deployed between the components described above and microprocessor 12 to facilitate interconnection between the components and the microprocessor.

Figure 2:
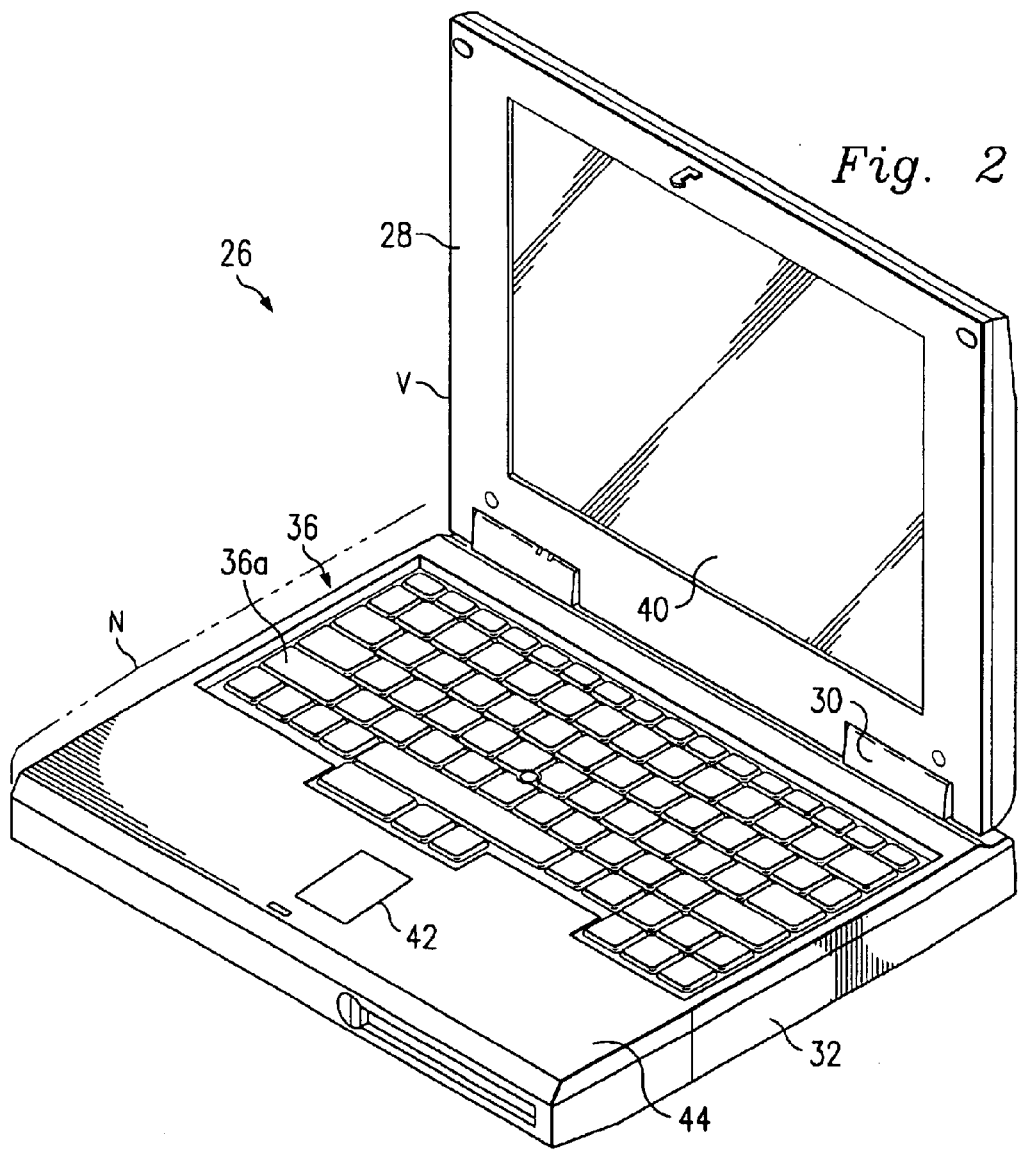
FIG. 2 is a perspective view illustrating an embodiment of a portable computer.

Referring to FIG. 2, illustrated is a portable, notebook size computer chassis designated 26 comprising a self-contained system, such as that illustrated at 10 in FIG. 1, and including a hinged top or lid 28, FIG. 2, rotatable about a hinge or hinges 30, from a nested position N, with a horizontal base 32, to a substantially vertical or open position V. The base 32 includes a base surface 31. Opening of the notebook computer 26 reveals a keyboard 36 including a plurality of keys 36a mounted on surface 31 of base 32, and a monitor screen 40 mounted in lid or top 28. A touchpad or other input 42 is mounted in a palmrest area 44 adjacent keys 36.

Figure 3:
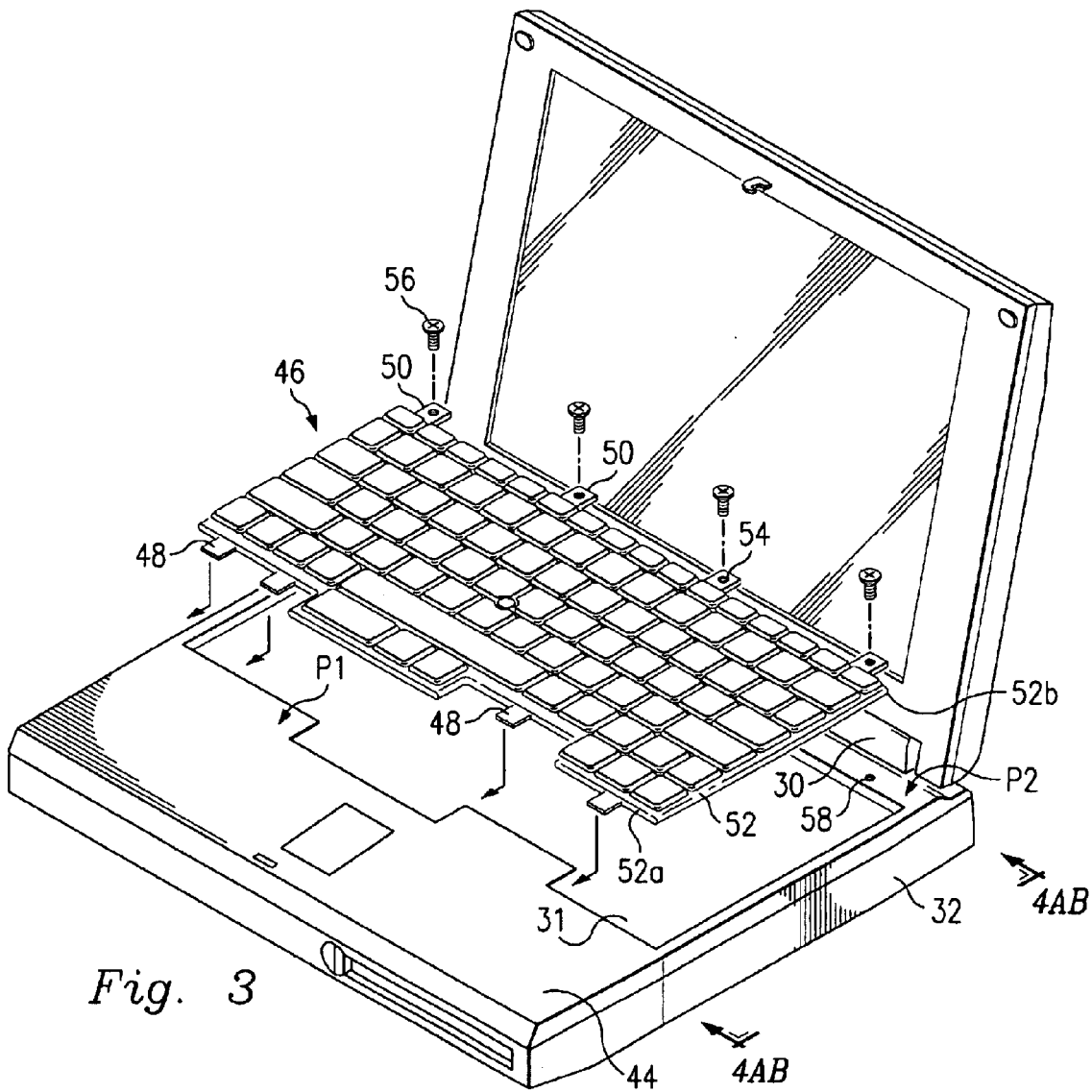
FIG. 3 is a perspective view illustrating an embodiment of a portable computer including an exploded view of a keyboard assembly.

In FIG. 3, a keyboard assembly 46 is illustrated and includes a plurality of retainer members or tabs 48 and 50 which extend outwardly from a support plate 52 of the keyboard assembly 46. The support plate 52 includes the tabs 48 and 50 as a means for attaching the support plate 52 to the base 32. Tabs 48 extend from an edge 52a of plate 52 and tabs 50 extend from another edge 52b of plate 52, which is opposite to the edge 52a. The tabs 50 each include a fastener aperture 54 formed therein. In this manner, attaching the support plate 52 to the base 32 is accomplished by inserting the tabs 48 under a portion P1 of the base 32 which is adjacent the palmrest area 44. The tabs 50 are then attached to the base 32 by means of fasteners 56 which extend through each fastener aperture 54 and into an aligned aperture 58 provided in a portion P2 of the base 32 which is adjacent to the hinges 30.

Figure 4A:
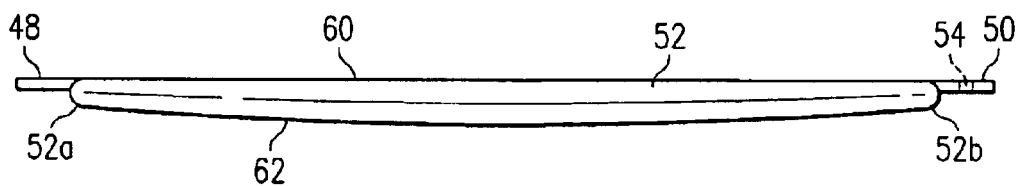
FIGS. 4A and 4B are end views illustrating alternate embodiments of a keyboard support plate as seen from the line 4AB—4AB of FIG. 3.

In FIG. 4A, it can be seen that support plate 52 includes a first surface 60, a second surface 62, the edge 52a including tabs 48 and the edge 52b including tabs 50 having aperture 54. In the FIG. 4A embodiment, the first surface 60 is substantially planar and the second surface 62 is substantially convex.

Figure 4B:
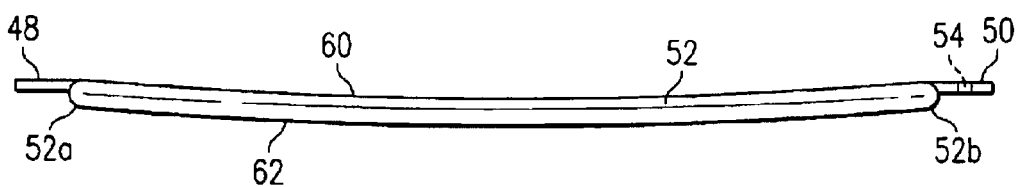

In FIG. 4B, it can be seen that support plate 52 includes first surface 60, second surface 62, edge 52a including tabs 48 and edge 52b including tabs 50 having aperture 54. In the FIG. 4B embodiment, the plate 52 has a bowed cross-section such that first surface 60 is substantially concave and second surface 62 is substantially convex. It is understood that the plate 52 of FIGS. 4A and 4B is exaggerated for purposes of illustration.

Figure 5:
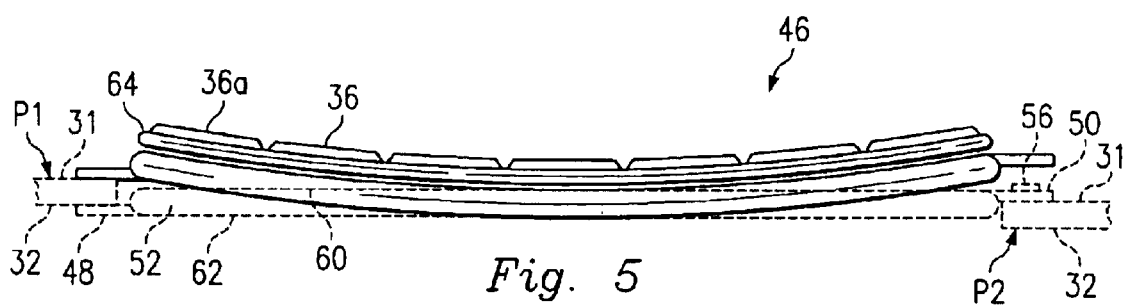
FIG. 5 is an exaggerated view illustrating the keyboard assembly in the unattached and attached positions with the base.

The keyboard assembly 46, referred to above and illustrated in FIG. 3, includes the support plate 52, FIG. 5, a membrane 64 mounted on first surface 60 and the keyboard 36 including keys 36a also mounted on the first surface 60 adjacent the membrane 64, in the well-known manner. However, the second surface 62 is advantageously convex so that when tabs 48 are inserted and retained under portion P1 of base 32, and tabs 50 are fastened to portion P2 of base 32 by fasteners 56 as described above, the convex surface 62 is flexed, and firmly abuts the base 32 so as to limit flexure of the keyboard assembly 46 during use. The same desired result may be achieved with either of the embodiments illustrated, i.e., FIGS. 4A and 4B.

Although illustrative embodiments have been shown and described, a wide range of modification, change and substitution is contemplated in the foregoing disclosure and in some instances, some features of the embodiment may be employed without a corresponding use of other features. Accordingly, it is appropriate that the appended claims be construed broadly and in a manner consistent with the scope of the embodiments disclosed herein.

What is claimed is:

1. A keyboard mounting system comprising:
    a support plate having opposed peripheral edges, a first surface and a second surface, the second surface being convex;
    a membrane mounted on the first surface;
    a plurality of keys mounted on the first surface adjacent the membrane;
    a plurality of retainer members extending from the opposed edges of the support plate; and
    a base surface, the support plate being mounted on the base surface by attachment of the retainer members, whereby the convex second surface is flexed into abutment with the base surface in response to the attachment.

2. The keyboard mounting system as defined in claim 1 wherein the support plate is bowed.

3. The keyboard mounting system as defined in claim 1 wherein the first surface is concave.

4. The keyboard mounting system as defined in claim 1 wherein the retainer members include tabs.

5. The keyboard mounting system as defined in claim 4 wherein some of the retainer members include fastener apertures formed therein.

6. A portable computer comprising:
    a base;
    a top pivotally mounted on the base;
    a base surface provided on the base; and
    a keyboard mounted on the base surface, the keyboard including:
        a support plate having opposed peripheral edges, a first surface and a second surface, the second surface being convex;
        a plurality of keys mounted adjacent the first surface; and
        means on the peripheral edges for attaching the support plate to the base so that the convex surface is flexed into engagement with the base in response to the attachment.

7. The portable computer as defined in claim 6 wherein the support plate has an arcuate cross-section.

8. The portable computer as defined in claim 6 wherein the first surface is concave.

9. The portable computer as defined in claim 6 wherein the means for attaching include tabs.

10. The portable computer as defined in claim 9 wherein some of the tabs include fastener apertures formed therein.

11. An information handling system comprising:
    a chassis;
    a microprocessor mounted in the chassis;
    an input coupled to provide input to the microprocessor;
    a storage coupled to the microprocessor;
    a base surface provided on the chassis; and
    the input including a keyboard mounted on the base surface, the keyboard including:
        a support plate having opposed peripheral edges, a first surface and a second surface, the second surface being convex;
        a plurality of keys supported adjacent the first surface; and
        a retainer member extending from each of the opposed edges of the support plate for attachment to the base for flexing the convex second surface into abutment with the base surface.

12. The information handling system as defined in claim 11 wherein the support plated is bowed.

13. The information handling system as defined in claim 11 wherein the first surface is concave.

14. The information handling system as defined in claim 11 wherein the retainer member includes a plurality of tabs.

15. The information handling system as defined in claim 14 wherein some of the tabs include fastener apertures formed therein.

16. A method of mounting a keyboard comprising:
    providing a base including a base surface;
    providing a support plate;
    forming the support plate to include a first surface and a convex second surface;
    mounting a plurality of keys on the first surface;
    providing retainer members on peripheral edges of the support plate;
    positioning the second surface in abutment with the base surface; and
    securing the retainer members on the base, whereby the convex second surface is flexed into abutment with the base surface in response to the securing.

17. The method as defined in claim 16 further comprising:
    mounting a membrane on the first surface between the support plate and the keyboard.

18. The method as defined in claim 16 wherein the forming includes bowing the support plate to form an arcuate cross-section.

* * * * *